United States Patent [19]

Hinojosa

[11] 4,062,774
[45] Dec. 13, 1977

[54] BRAKE FLUID FILTER

[75] Inventor: Carlos R. Hinojosa, Camuy, P.R.

[73] Assignee: Besendruch-Hofmann Inc., Lindenhurst, N.Y.

[21] Appl. No.: 621,156

[22] Filed: Oct. 9, 1975

[51] Int. Cl.² ............................................. B01D 35/00
[52] U.S. Cl. ...................................... 210/94; 210/232; 210/311; 210/312; 210/335; 210/444; 210/455
[58] Field of Search ................. 210/94, 311, 312, 335, 210/336, 349, 436, 444, 446, 448, 455, 510, 451, 452, 232

[56] References Cited
U.S. PATENT DOCUMENTS

| 2,453,895 | 11/1948 | Corwin | 210/311 |
| 2,661,847 | 12/1953 | Buettner | 210/444 |
| 2,707,562 | 5/1955 | Kasten | 210/436 |
| 2,720,278 | 10/1955 | Wiley | 210/510 |
| 3,122,501 | 2/1964 | Hultgren | 210/94 |
| 3,561,602 | 2/1971 | Molitor | 210/335 |
| 3,681,562 | 8/1972 | Winzen | 210/94 |

FOREIGN PATENT DOCUMENTS

| 636,884 | 3/1962 | Italy | 210/444 |
| 536,941 | 12/1955 | Italy | 210/444 |

*Primary Examiner*—Frank W. Lutter
*Assistant Examiner*—David L. Lacey
*Attorney, Agent, or Firm*—Edward H. Loveman

[57] ABSTRACT

A filter device for straining brake fluid in a hydraulic brake system comprises a disk shaped core the opposite sides of which are attached to a cup shaped bowl. A filter element is secured to one side of the core in one bowl. Nipples integral with the core extend radially outward and communicate with radial bores in the core. The bores have axial portions opening at opposite sides of the core in the bowls. One pipe may connect the filter device to the reservoir of a master brake cylinder via one nipple, and another pipe may connect the filter device to a source of brake fluid via the other nipples. A bleed hole adapted to be closed by a removable screw is provided in the outer wall of each of the bowls. The filter element may have a porous body made of sintered metal and may have a cylindrical outer wall with a reentrant conical wall.

8 Claims, 4 Drawing Figures

BRAKE FLUID FILTER

This invention relates to the art of fluid filters and more particularly concerns a filtering device especially adapted for use in a hydraulic brake system of a vehicle for straining the brake fluid passing between the master cylinder and a source of brake fluid.

It has been conventional to provide fluid filters of various types in vehicles to remove foreign matter from engine oil and liquid fuel. Some of these prior filters include bypass arrangements for passing liquid around a clogged filter element. None of the prior filter elements are specifically designed for filtering brake fluid in a hydraulic brake system and so cannot be efficiently used for this purpose.

According to the present invention, there is provided a filter assembly including two bowls secured to opposite sides of a central disk shaped core. The core has two diametrically opposed and aligned nipples each respectively opening into a different bore for passing brake fluid radially of the core. The bores extend axially in opposite directions and communicate with the interiors of the respective bowls. A filter element is mounted axially on the core in one of the bowls. Bleed holes closed by screws at outer ends of the bowls permit bleeding air, water and dirt from the bowls. The bowl containing the filter element serves primarily as a dirt and water trap member while the other bowl traps air.

It is the primary object of the present invention to provide a brake fluid filter for a vehicle hydraulic system. It is another object of the present invention to provide a brake filter capable of removing air from the hydraulic system.

These and other objects and many of the attendant advantages of this invention will be readily appreciated as the same becomes better understood by reference to the following detailed description when considered in connection with the accompanying drawings in which.

Figure 1:
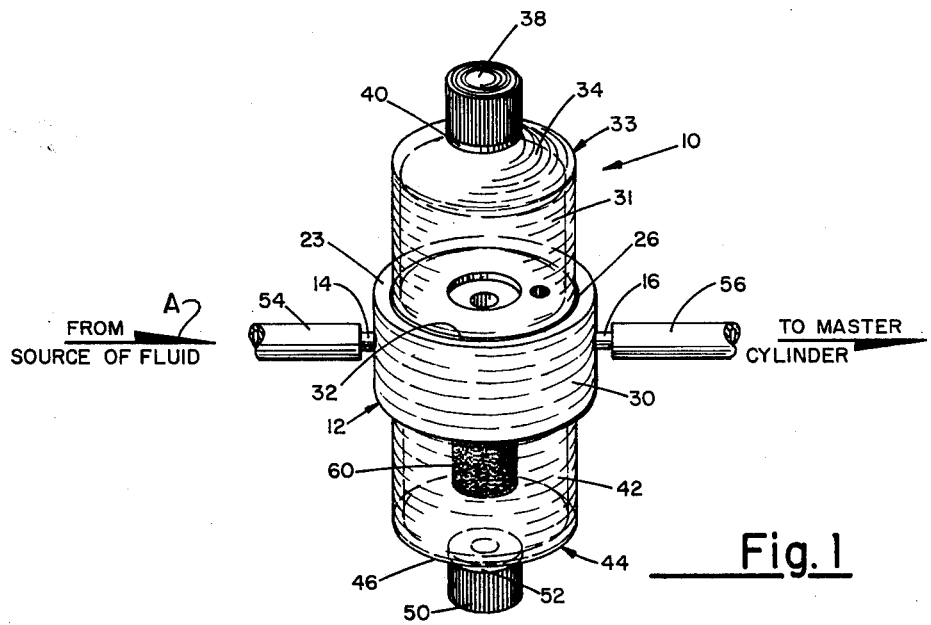
FIG. 1 is a perspective view of a filter device embodying the present invention.
Figure 2:
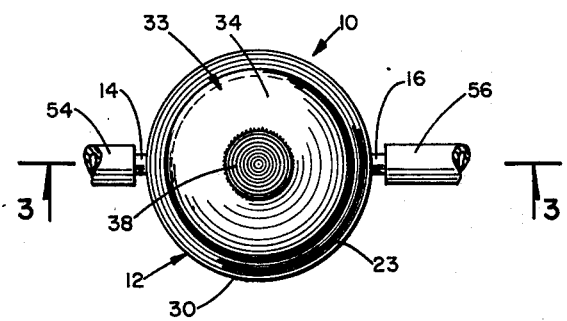
FIG. 2 is a top plan view of the device.

Referring now to the drawings wherein like reference characters designate like or corresponding parts throughout, there is illustrated in FIGS. 1-4, a filter device generally designated as reference numeral 10, especially adapted for filtering brake fluid in a hydraulic brake system. The device 10 has a central disk shaped core 12 provided with diametrically opposed and aligned integral nipples 14, 16 each of which has a bore which is in flow communication with a respective diametrically aligned radial bore 18 and 20 in the core 12. The bore 18 has an axially extending portion 18' opening at one side 21 of the core 12, while the bore 20 has an axially extending portion 20' opening at the other side 23 of the core 12. The core 12 is further formed with a central, axial bore 24 having enlargements 24a and 24b at opposite ends defining recesses at opposite sides of the core 12.

The core 12 is further formed with two circular grooves 26, 28 each located at opposite sides of the core 12 near the peripheral cylindrical outer side 30. Fitted in the groove 26 and permanently secured by a cement 32 is the open end of a cylindrical wall 31 of a cup shaped cylindrical bowl 33 which has a closed end wall 34 provided with a central threaded bleed hole 36 adapted to be sealed by a resilient washer 40 and a removable screw 38. Fitted in the groove 28 and secured by a cement 41 is the open end of a cylindrical wall 42 of another cup shaped bowl 44. A closed end wall 46 of bowl 44 has a central threaded bleed hole 48 which is adapted to be sealed by a resilient washer 52 and a removable screw 50. Flexible pipes 54 and 56 are respectively attached to externally grooved nipples 14 and 16 for passing brake fluid through the filter.

A cylindrical filter element 60 is axially seated and secured in the recess 24b and extends downwardly into the lower bowl 44 and has an outer cylindrical wall 62 and a reentrant conical section 64 extending inwardly from the outer or lower end of the wall 62. The filter element 60 is preferably made of sintered metal such as brass and has a porous structure so that it passes brake fluid under pressure and effectively blocks foreign matter and debris from passing through the filter device 10.

Both bowls 33 and 44 and core 12 are preferably formed of rigid transparent plastic material having high impact stength, durability, dimensional stability and high resistance to chemical reaction with brake fluid, air, oil, liquid, fuel, water, etc. A suitable material for this purpose is a polycarbonate, but other types of plastic having the desired properties may be used.

In operation of the filter device 10, brake fluid F normally fills the bowls 33 and 44, the core 12, the nipples 14 and 16, and the pipes 54, 56. The pipe 56 will be attached to a master brake cylinder (not shown) which serves as a reservoir for a brake fluid F. The pipe 54 is attached to a source of hydraulic fluid external to the vehicle (not shown). Application of hydraulic pressure to the external source of hydraulic fluid forces the brake fluid F through the pipe 54 into the bowl 44 via the bore 18, then through the filter element 60 and through the bore 24 to the bowl 33. From the bowl 33 the fluid is forced via bore 20 into the pipe 56 to the master cylinder of the system. Foreign matter, water, dirt and debris collects in the lower bowl 44 and may be periodically removed via the bleed hole 48 upon loosening and/or removal of the screw 50. Air may collect in the upper bowl 33 and may be removed via the bleed hole 36 by loosening and/or removing the screw 38 and filling the bowl 33 with the brake fluid F. This proceedure should be followed when charging the system, and before it is put into use.

Figure 3:
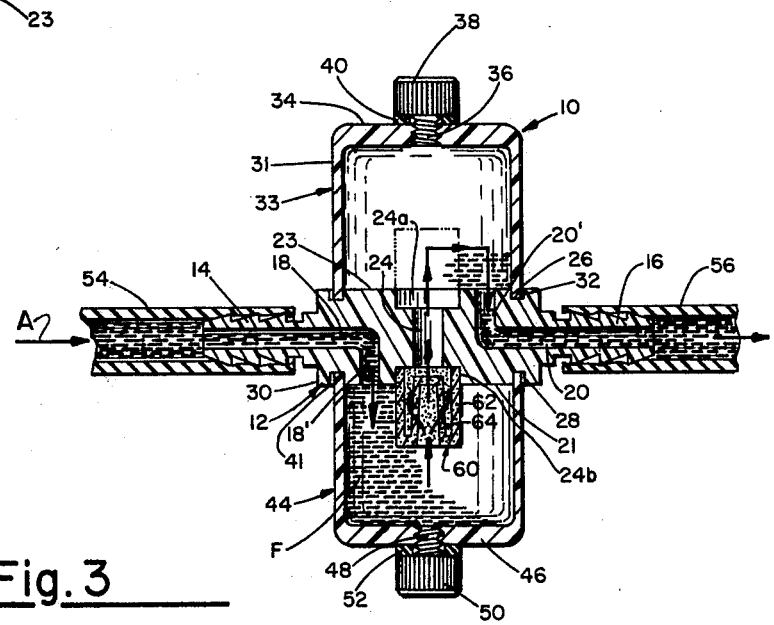
FIG. 3 is a central, vertical sectional view taken along line 3—3 of FIG. 2.
Figure 4:
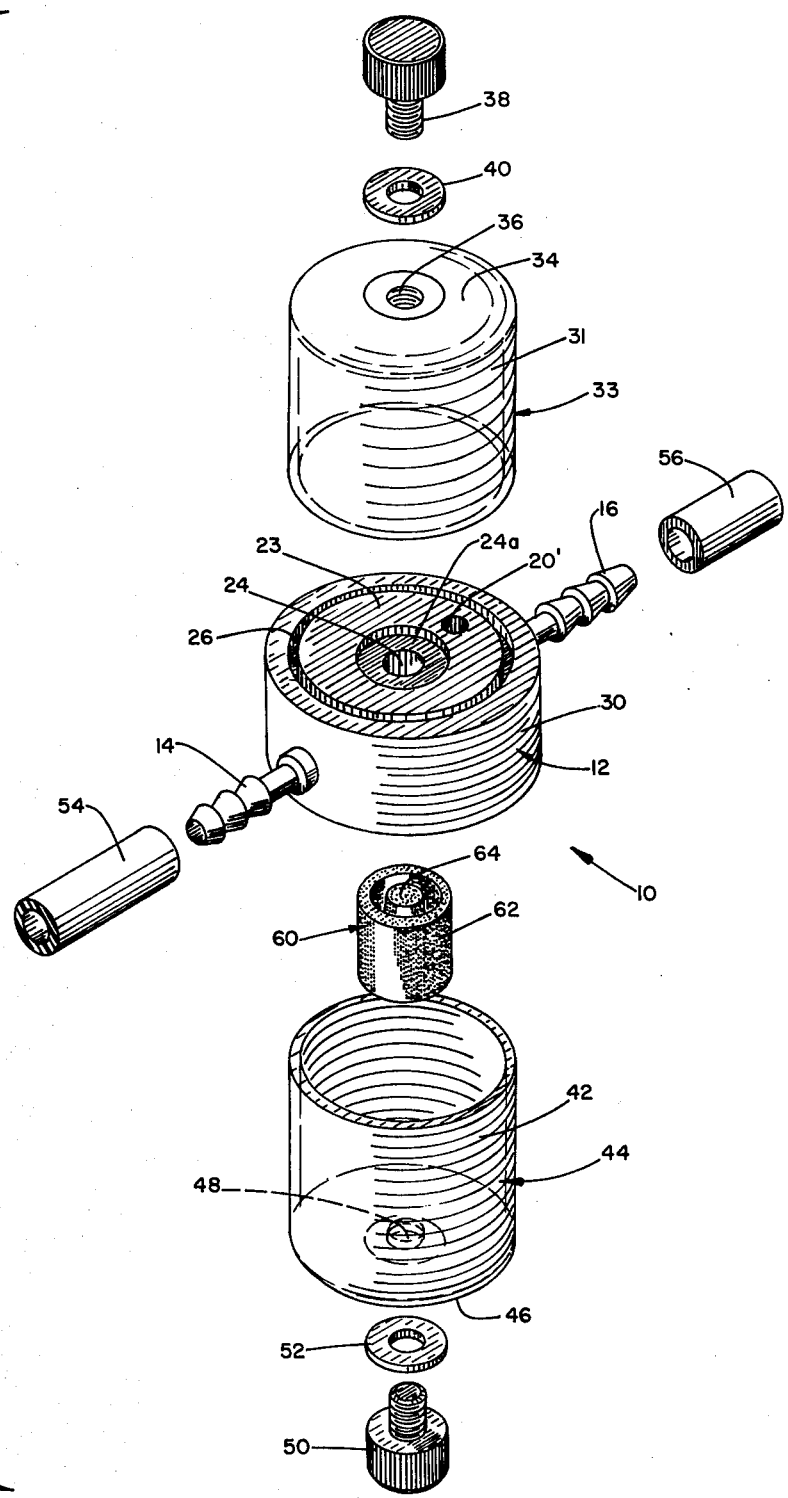
FIG. 4 is an exploded perspective view of parts of the filter device.

If desired, it is possible to provide another filter element in the bowl 33 as indicated by the dotted lines in FIG. 3, to increase the filtering action, and to cooperate with the element 60 to prevent air bubbles from feeding back through the core 12 into the bowl 44. The arrows A in FIGS. 1 and 3 show the direction of fluid flow when pressure is applied. Although the brake fluid filter device 10 has been illustrated with regard to filling the reservoir of the master cylinder of a vehicle hydraulic brake system, it should be understood that the device 10 may be installed permanently between the master cylinder and the brake cylinders.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A filter device for filtering a brake fluid in a hydraulic brake system, comprising:

a disk shaped core having two opposite flat sides, and a cylindrical wall, with two diametrically opposed and aligned integral nipples, each of said nipples having a bore which is in flow communication with a respective diametrically aligned radial bore in said core, each of said radial bores in said core extending radially through said cylindrical wall, and having axially extending portions opening respectively at opposite sides of said core, and a central axial other bore opening at opposite ends at opposite sides of said core, each of said ends of said axial bore having an enlargement to define a recess;

said nipples further comprising means for attaching a fluid conducting pipe to each of said nipples to communicate through said cylindrical wall with said radial bores in said core respectively, for passing said fluid into and out of said core;

a cupped shaped bowl secured to each of the opposite sides of said core for containing fluid passing through said core; and a filter element in one of said recesses communicating with said central bore for straining said fluid passing through said core.

2. A filter device as defined in claim 1, wherein each of said bowls has an outer wall formed with a bleed hole, and further comprising screws removably engaged in said bleed holes respectively for bleeding air and debris from said bowls.

3. A filter device as defined in claim 2, wherein said core is further formed with circular grooves at opposite sides thereof, said bowls having cylindrical walls respectively secured in said grooves.

4. A filter device as defined in claim 3, wherein said bowls and said core are formed of a rigid transparent material so that said fluid filling said bowls and said bores is externally visible.

5. A filter device as defined in claim 4, wherein said filter element has an outer cylindrical wall seated at one end in one of said recesses, said device further comprising another filter element having an outer cylindrical wall seated at one end in the other one of said recesses, both of said filter elements being disposed in axial alignment to cooperate with each other in straining brake fluid passing through said core.

6. A filter device as defined in claim 5, wherein each of said filter elements has a porous body formed of sintered metal, each of said filter elements having a reentrant conical wall integral with said outer cylindrical wall of said filter elements.

7. A filter device as defined in claim 1, wherein said filter element has a porous body made of sintered metal.

8. A filter device as defined in claim 1, wherein said filter element has a reentrant inner conical wall integral with an outer cylindrical wall of said filter element to maximize the area said filter element is exposed to said brake fluid.

* * * * *